Sept. 22, 1931.     J. RAMSTAD     1,824,170
CULTIVATOR ATTACHMENT
Filed June 13, 1930
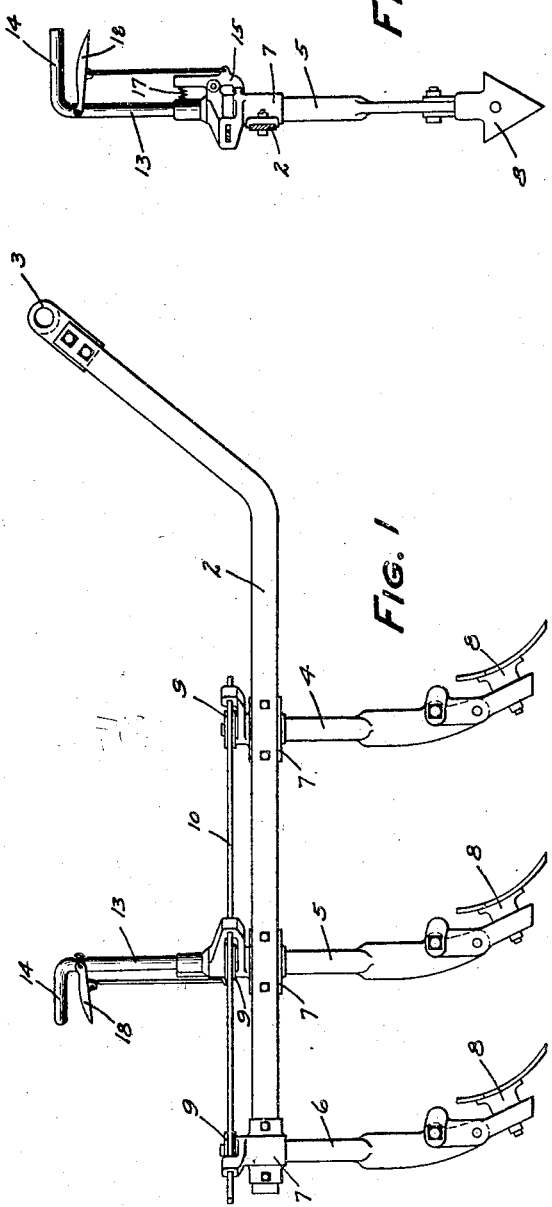
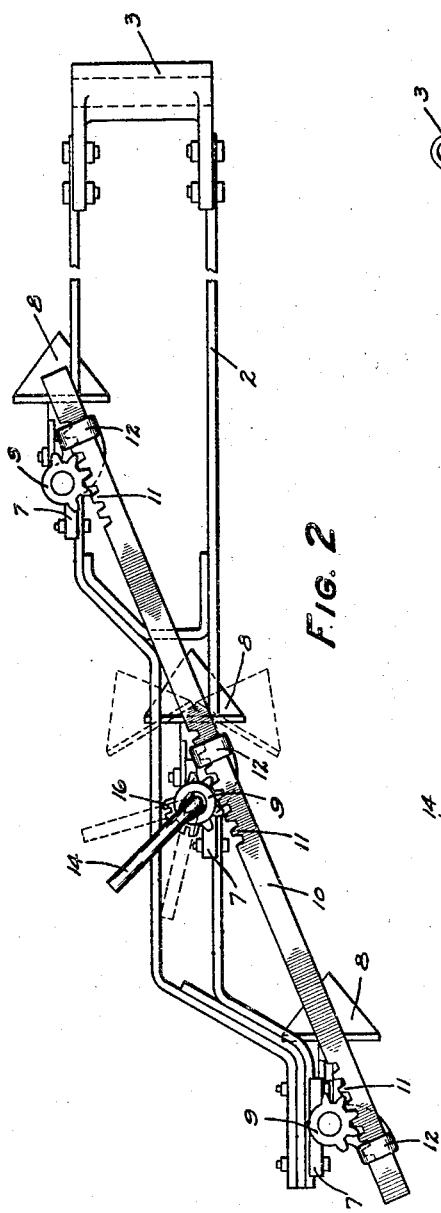
INVENTOR
JORGEN RAMSTAD
BY
ATTORNEYS Patented Sept. 22, 1931

1,824,170

UNITED STATES PATENT OFFICE

JORGEN RAMSTAD, OF STILLWATER, MINNESOTA, ASSIGNOR TO STATE OF MINNESOTA

CULTIVATOR ATTACHMENT

Application filed June 13, 1930. Serial No. 460,904.

The invention relates to a riding type of cultivator and particularly one having a plurality of beams and cultivating shovels thereon.

The primary object of the invention is to provide an attachment for the cultivator whereby the shovels may be easily and conveniently adjusted about their vertical axes to change the position of the shovels with respect to the path of the cultivator.

A further object is to provide a cultivator adjusting means of simple, inexpensive construction by which the operator of the machine can simultaneously shift the cultivators on each beam.

The invention consists generally of various constructions and combinations, all as hereinafter described and particularly pointed out in the claim.

In the accompanying drawings forming part of this specification,

Figure 1 is a side view of a cultivator beam showing the cultivators thereon and my improved mechanism for shifting the cultivators on a vertical axis;

Figure 2 is a plan view; and

Figure 3 is a detail view illustrating the means for locking the cultivators in their adjusted positions.

In the drawings, 2 represents a cultivator beam having a hub 3 at the forward end by means of which the beam may be mounted on a cross bar or shaft and on which the beam has a vertical, oscillating movement, as usual in machines of this type. 4, 5 and 6 represent the shanks of the cultivators journaled for rotary movement in suitable bearings 7 on the cultivator beam and arranged diagonally of the beam as usual in cultivators of this type. I have shown three of these cultivators equally spaced apart, but do not confine myself to this arrangement, as a greater or less number may be employed and they may be arranged in a different relative position if preferred. The lower ends of the shanks are equipped with the usual shovels 8 which may be of any suitable form that is best adapted for the work to be performed. The usual triangular type is herein shown.

It is desirable in a machine of this kind to rotate the shanks of the shovels for the purpose of changing the position of the shovel blades with respect to the soil in which the cultivator is working and for the purpose of conveniently effecting a simultaneous rotation of these shanks, I prefer to equip each shank with a suitable mutilated gear 9 rigidly mounted on the upper portion of each shank. A bar 10 is provided with rack teeth 11 which engage the teeth of the gears 9 and said bar, preferably flattened in form, is adapted to slide horizontally in guides 12 provided on the cultivator beam. These guides are preferably arranged near the cultivator shanks and serve to hold the beam 10 in engagement with the teeth of the gears 9, allowing it, however, to slide forwardly and backwardly in a diagonal direction with respect to the beam so that when the bar is operated, all of the shanks of one beam will be adjusted simultaneously.

A suitable handle 13 forms a continuation of the middle shank 5 and is provided with a hand grip 14 and is locked in its adjusted positions by means of a latch 15 which engages the notches of a rack 16, being normally held in engagement with the rack by a spring 17 and released by means of the hand grip 18 suitably connected with the lower portion of the latch, as shown plainly in Figure 3.

When, therefore, the operator of the machine wishes to change the adjustment of the shovels, he may release the locking latch, turn the handle 13 and shank 5 and through the connection of the bar 10 with the other shanks, he may rotate all of them on one beam simultaneously, and when the desired adjustment is obtained, it is only necessary to release the locking latch 15 when the bar and the shanks will all be simultaneously locked and prevented from movement until another adjustment is desired.

It will be understood that the other beams of the machine may be equipped in a similar manner and provided with a similar operating means so that the driver can obtain the desired adjustment of the shovels of several beams according to the work that is to be performed.

In various ways the details of construction herein shown and described may be modified and still be within the scope of my invention.

I claim as my invention:

The combination with a beam having guides thereon, of a plurality of shovel shanks mounted for rotation on said beam and provided with ground-engaging shovels, a single bar slidable longitudinally in said guides and having a series of teeth formed in one edge opposite and near the shanks of said shovels, a gear secured on each shank to mesh with the opposite teeth of said bar, said guides holding said gears and bar together, one of said shanks having a handle forming a continuation thereof for moving said bar longitudinally to rotate said shanks, and a latch and rack for normally locking said bar against premature longitudinal movement.

In witness whereof, I have hereunto set my hand this 10 day of June 1930.

JORGEN RAMSTAD.